United States Patent [19]

Levy et al.

[11] Patent Number: 4,822,970
[45] Date of Patent: Apr. 18, 1989

[54] METHOD AND APPARATUS FOR PURGING THE ERODING ZONE DURING ELECTROEROSIVE COUNTERSINKING

[75] Inventors: Gideon Levy, Orselina; Claudio Libotte, Gentilino; Marco Boccadoro, Verscio; Silvano Magginetti, Locarno, all of Switzerland

[73] Assignee: AG fur industrielle Elektronik AGIE, Losone, Switzerland

[21] Appl. No.: 134,281

[22] Filed: Dec. 17, 1987

[30] Foreign Application Priority Data

Dec. 22, 1986 [DE] Fed. Rep. of Germany ....... 3644042

[51] Int. Cl.$^4$ .............................................. B23H 7/32
[52] U.S. Cl. ........................... 219/69.16; 204/129.25; 204/129.5; 204/224 M; 219/69.14
[58] Field of Search ........... 204/129.25, 129.5, 224 M, 204/225; 219/69 D, 69 G, 69 V, 69 M, 69 S, 69 R, 68

[56] References Cited

U.S. PATENT DOCUMENTS

| | | | |
|---|---|---|---|
| 3,213,257 | 10/1965 | Ferguson | 219/69 G |
| 3,370,147 | 2/1968 | Matulaitis | 219/69 G |
| 3,777,104 | 12/1973 | Bell, Jr. | 219/69 G |
| 3,909,577 | 9/1975 | Houman | 219/69 D |
| 3,975,607 | 8/1976 | Ullmann et al. | 219/69 G |
| 4,367,400 | 1/1983 | Otto et al. | 219/69 D |
| 4,700,039 | 10/1987 | Konne et al. | 219/69 G |

FOREIGN PATENT DOCUMENTS

| | | | |
|---|---|---|---|
| 2313263 | 9/1974 | Fed. Rep. of Germany. | |
| 2734682 | 2/1978 | Fed. Rep. of Germany. | |
| 2711697 | 9/1978 | Fed. Rep. of Germany | 219/69 G |
| 53-85598 | 7/1978 | Japan | 219/69 C |
| 152529 | 11/1981 | Japan | 219/69 C |
| 59-69220 | 4/1984 | Japan. | |

Primary Examiner—A. D. Pellinen
Assistant Examiner—Geoffrey S. Evans
Attorney, Agent, or Firm—Helfgott & Karas

[57] ABSTRACT

Method and apparatus for purging the eroding zone during electroerosive countersinking, in which one or more short-stroke second raising lowering movements of a tool electrode relative to a workpiece are performed in the dielectric between two first long stroke raising/lowering movements and the frequency and/or height of stroke of the raising/lowering movements is automatically adapted to the conditions in the working gap.

18 Claims, 3 Drawing Sheets

METHOD AND APPARATUS FOR PURGING THE ERODING ZONE DURING ELECTROEROSIVE COUNTERSINKING

BACKGROUND OF THE INVENTION

The invention relates to a method for purging the eroding zone during electroerosive countersinking, in which first raising/lowering movements of the tool electrode relative to the workpiece are performed in the dielectric.

The invention also relates to an apparatus for purging the eroding zone in an electroerosive countersinking installation with a raising/lowering device for bringing about first raising/lowering movements of the tool electrode relative to the workpiece in the dielectric.

Such methods and apparatuses are generally known in connection with electroerosive countersinking installations. The aforementioned raising/lowering movements have a pumping effect in the dielectric, e.g. an oil, which can be used for purging and in particular for cleaning the eroding zone.

The following procedure is normally adopted during countersinking erosion. On the basis of the actual erosion installation, e.g. the available purging device, the electrode used and the workpiece to be machined, as well as the sought working objective, e.g. the desired geometry, the desired surface quality, the eroding intensity, the small amount of wear, etc., on the basis of existing technological guidelines, the geometrical ($\Delta R$, $\Delta B$, $\Delta Z$, $\Delta X$, $\Delta Y$) and the method-specific (U, I, T, Q etc.) parameters, also called off-line parameters are determined, whereby the meanings are as follows:

$\Delta R$: radial advance step (e.g. for stepwise widening)
$\Delta \beta$: angular increment for radial working movement
$\Delta Z$: Z-axial increment
$\Delta X$: X-axial increment
$\Delta Y$: Y-axial increment
U: no-load voltage
I: current intensity
T: pulse length
Q: purging quantity If the aforementioned off-line parameters have been carefully chosen, the erosion process can start. The erosion process can e.g. be characterized by pulse-specific, physical parameters, such as the igniting delay time $t_d$, the short-circuit part $t_c$, etc. These parameters can be influenced by the so-called on-line actions on the servosensitivity $\dot{\gamma}$, the servoreference voltage $\psi$ in the gap, the eroding zone scavenging $\Delta Q$, the internal time $\Delta T$, etc.

The quality of an electroerosive countersinking process can be characterized by the process efficiency and the process stability. The process efficiency supplies information on the efficiency of the physical process, e.g. the no-load part and the short-circuit part. The process stability provides information on the dynamic behaviour of the machining, e.g. the spindle sleeve movement, etc.

The process efficiency and stability are reduced by any process problem. Unfortunately the erosion process is always accompanied by problems, which are caused by the process, or which are imparted to the latter from the outside.

Generally during an electrorosive countersinking process actions are necessary in order to guarantee its further performance, e.g. if an arc starts to form in the depth of the working or eroding zone. For such cases an electroerosion plant contains monitoring systems, called automatic anti-short-circuit systems. In a countersinking erosion installation these systems frequently lead to a raising/lowering movement or simply a return movement of the spindle sleeve in the case of a fault.

These raising/lowering movements, which are also called timer movements, are used for cleaning the working zone and therefore make the working process safe.

It is also known not only to perform these timer movements in the case of a short-circuit, but also on precautionary basis at regular intervals, so as to prevent short-circuits as far as this is possible. A certain action frequency can be given thereto by the machine operator, or in other words there is a specific time interval between two timer movements. This action frequency is generally dependent on the given off-line parameters, but also by the penetration depth of the tool electrode in the working zone. The height of stroke of the timer movements can also be predetermined.

However, the timer movements impair the process stability and sufficiency and in particular increase the working time.

SUMMARY OF THE INVENTION

The invention is directed toward a method and apparatus for shortening the working time in an electroerosive countersinking installation.

From the method standpoint, the working time is shortened by inserting between two successive first raising/lowering movements in the preamble-basing method, one or more shorter stroke, second raising/lowering movements of the tool electrode relative to the workpiece which are performed in the dielectric.

From the apparatus standpoint, the working is shortened by constructing the raising/lowering device in two-stage manner, so that between two successive first raising/lowering movements, it performs one or more shorter stroke second raising lowering movements of the tool electrode relative to the workpiece.

The invention is based on the discovery that for clearing the eroding zone by good purging and eliminating local contamination it is sufficient to have short-stroke raising/lowering movements if there is intermediately a long-stroke raising/lowering movement. It is sufficient to provide for the long-stroke raising/lowering movement that height of stroke previously provided for the raising/lowering movements.

The interposing of the short-stroke raising/lowering movements between the normal raising/lowering movements not only leads to a shorter dead time and therefore to an increase in the working efficiency, but it also leads to a much smaller reduction in the process stability than when performing normal or long-stroke raising/lowering movements.

The method is preferably performed in such a way that the number, the height of stroke and/or the frequency of the short-stroke, second raising/lowering movements interposed between two first raising/lowering movements is kept constant. This makes it possible in a particularly simple manner to shorten the working time and to monitor the process sequence. The inventive method can be particularly simply realized in that with regards to the frequency no distinction is made between first and second, i.e. normal and short stroke raising/lowering movements and instead each individual raising/lowering movement has the same time interval with respect to its predecessor.

Preferably the height of stroke of the short-stroke raising/lowering movements is 1/20 to 3/4 and in particular 1/10 to 1/2 and is especially preferred manner 1/6 to 1/3 of the stroke height of the long-stroke raising/lowering movements. It is possible to use as a basis an average stroke height of the long-stroke raising/lowering movements, so that the stroke height of the short-stroke raising/lowering movements is constant for the duration of the complete erosion process. This measure can be relatively simply performed from the operational standpoint, but has the consequence that with increasing penetration depth of the tool electrode into the workpiece the frequency of the timer movements is increased and/or the number of short-stroke timer movements interposed between two long-stroke timer movements must be reduced. However, if the stroke height of the short-stroke timer movements is adapted to the stroke height of the long-stroke timer movements, the stroke heights of both timer movements can increase with increasing penetration depth of the tool electrode into the workpiece and in certain circumstances it is possible not to have any frequency increase and/or reduction in the number of interposed short-stroke time movements. Thus, an increase in the height of stroke of the timer movements increases the purging effect and leads to a good purging of the eroding zone specifically in the case of great penetration depth of the tool electrode into the workpiece.

Preferably the optimum timer frequency is determined through allowing the erosion process to freely take place during a setting phase, a raising/lowering movement is in each case performed during a developing short-circuit situation and the average time interval between two developing short-circuit situations is determined. This time interval is then given as the period for the timer movement, whereby said period is preferably also reduced by a safety value, or in other words the frequency is correspondingly increased.

An automatic adaption of the frequency of the timer movements to varying process conditions leads to a further reduction in the working time. Such an adaptation is preferably performed in that it is established within varyingly long counting intervals whether and optionally how many short-circuit situations have developed despite the already existing timer movements. If one or more short-circuit situations have developed during the short counting interval, or during immediately succeeding short counting intervals, the given time frequency is increased. However, if during the longer counting interval, or during several directly succeeding longer counting intervals no short-circuit situations have developed, then the timer frequency is reduced. The adaptation of timer movements to varying process conditions is known per se, e.g. from German Pat. No. 27 34 682 (Charmilles) or JP-OS No. 59-69220 (Fanuc).

DETAILED DESCRIPTION OF THE PREFERRED EMBODIMENTS

Figure 1:
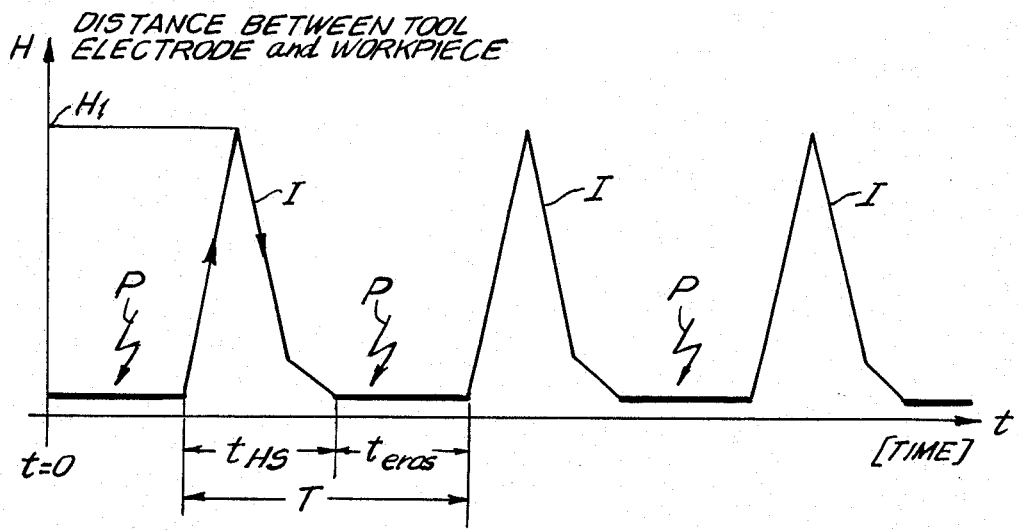
FIG. 1 is a graph of the movement sequence of the timer movements according to the prior art.

FIG. 1 shows the distance H between the tool electrode and workpiece with respect to the time t during erosion. According to FIG. 1 the tool electrode is drawn away from the workpiece by the stroke height $H_1$ at constant time intervals and is then again moved up to the workpiece with a constant with a constant value. During this raising/lowering movement, hereinafter called timer movement, no erosion takes place. The associated time interval is designated $t_{HS}$. Erosion takes place in the immediately following time interval $t_{eros}$ and is indicated by the forked arrow P. The timer movements carry the reference I.

Figure 2:
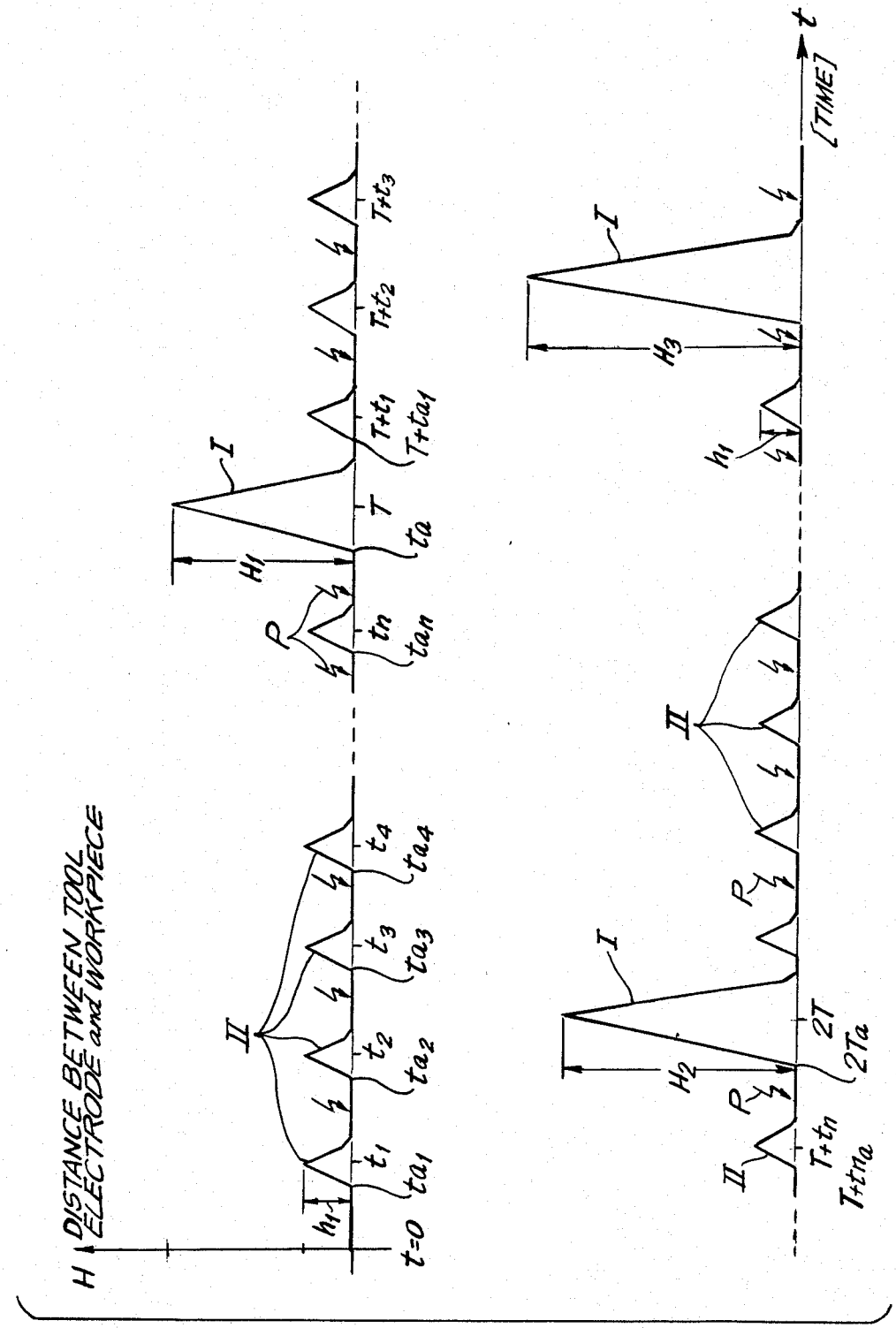
FIG. 2 is a graph of the movement sequence of the timer movements according to an inventive embodiment.

The inventive embodiment shown in FIG. 2 essentially differs from the prior art in that between two first timer movements I are performed several short-stroke second timer movements II. According to FIG. 2 the erosion process starts with time t equal to zero. At given time intervals $t_1, t_2, t_3 \ldots t_n$, short-stroke timer movements II of the spindler sleeve securing the tool electrode 3 are performed in the Z-direction in the case of Z-erosion. In the represented embodiment the number n is equal to 10 and the time interval between two short-stroke timer movements is constant, i.e. $t_m - t_{m-1} =$ constant, with m being an integer and 1 m 10. The stroke height $h_1$ of the short-stroke timer movements II amounts to approximately 1 mm. After the tenth short-stroke timer movement II, the first long-stroke timer movement I is performed and has a stroke height $H_1$ of approximately 4.5 mm. This is again followed by ten short-stroke timer movements II followed at time 2T ($= 2 \times t_{n+1}$) by a long-stroke timer movement I, whose stroke height can be fundamentally the same as the stroke height of the preceding long-stroke timer movements I, i.e. in this embodiment $H_1$. After a further n short-stroke timer movements II, there is once again a long-stroke timer movement I and so on.

In the represented embodiment the stroke height of the long-stroke timer movements I is gradually increased as a function of the penetration depth of the tool electrode 3 into workpiece 3'. The time-based increase in the penetration depth of the tool electrode into the workpiece is measured in accordance with the embodiment shown in FIG. 3 and ensures a gradual increase in the stroke heights and reference will be made hereinafter thereto. In the represented embodiment the stroke heights $H_1$, $H_2$ and $H_3$ are 4.5, 4.55 and 4.6 mm.

In principle the short-stroke timer movements II can also increase with increasing penetration depth, e.g. in a fixed ratio to the stroke height of the long-stroke timer movements I preceding them.

Obviously the number of short-stroke timer movements II can be modified between two long-stroke timer movements I, their time interval or frequency and/or their raising/lowering rate.

In particular, e.g. the number of short-stroke timer movements II can be reduced with increasing penetration depth of the tool electrode into the workpiece.

In the represented embodiment the time intervals between the start of a timer movement are identical, no matter whether it is a long-stroke or a short-stroke timer movement. The starting times of the short-stroke timer movements II are designated $t_{a1} t_{a2}, \ldots t_{an}, T + t_{a1} \ldots$ and the starting times of the long-stroke timer movements by $T_a$, $2T_a$.

Figure 3:
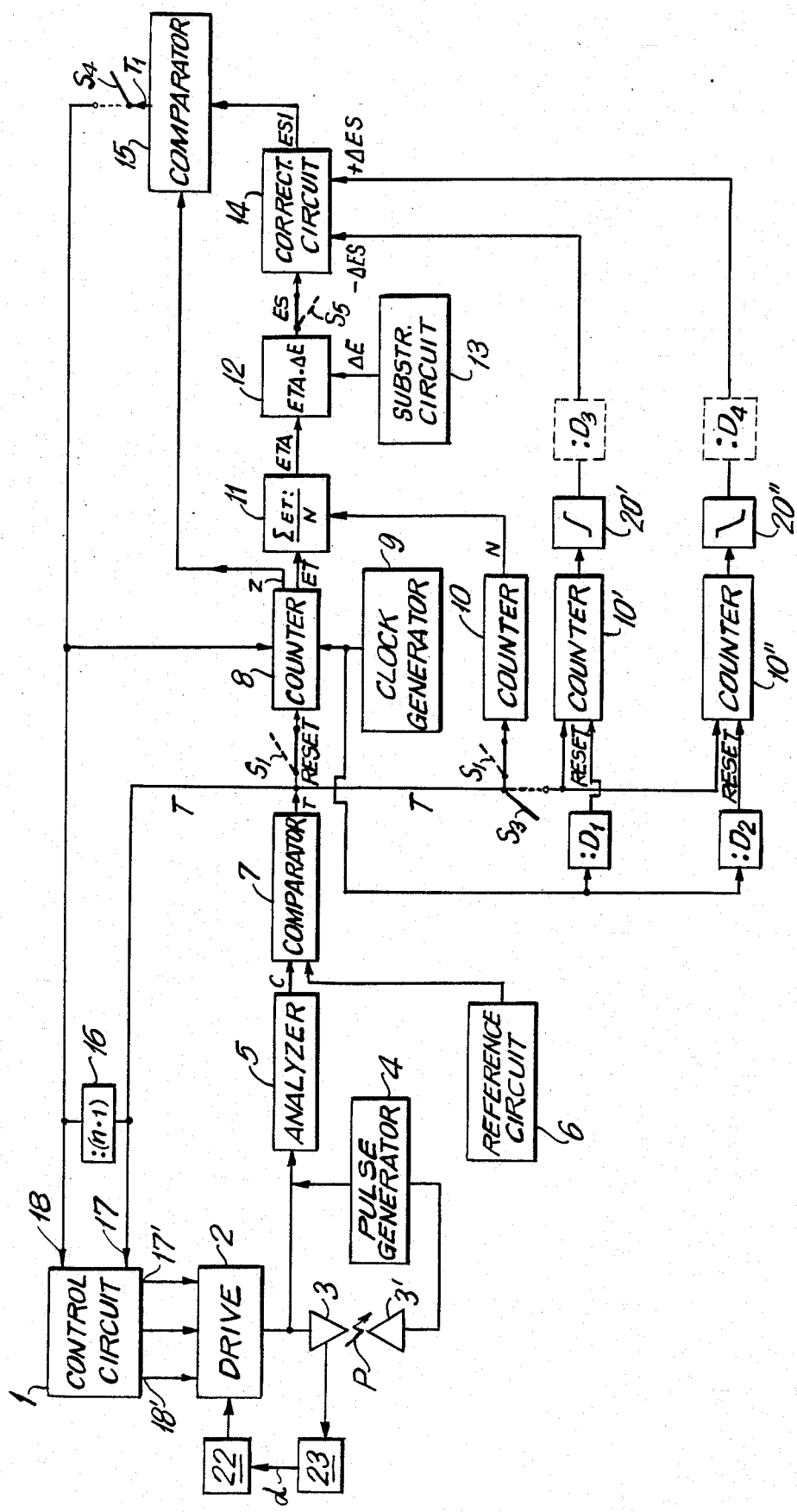
FIG. 3 is a circuit diagram of an embodiment of an apparatus for performing the timer movement shown in FIG. 2.

The circuit diagram shown in FIG. 3 permits the automatic setting of an optimum timer frequency during a starting or setting phase, an adaptation of this frequency to conditions in the eroding zone which may change during erosion, as well as an adaptation of the stroke height of the timer movements to an increasing penetration depth of the tool electrode 3 into workpiece 3'.

According to FIG. 3 a pulse generator 4 is provided, which supplies voltage/current pulses to the electrodes bounding the working gap. These are the tool electrode 3 and workpiece electrode 3', hereinafter called workpiece. The working gap, hereinafter referred to as the eroding zone, is marking by the arrow P.

Under normal working conditions, a drive 2 continuously moves the tool electrode 3 against workpiece 3', in such a way that there is a substantially constant distance between the front face of tool electrode 3 and the surface of workpiece 3' directly facing it. The operation of drive 2 is controlled by a control circuit 1.

If erosion does not take place in the Z-direction, as has been assumed hereinbefore and instead e.g. takes place in the X or Y-direction, then the drive 2 advances the tool electrode 3 in the X or Y-direction against workpiece 3'. The current/voltage conditions in the eroding zone are determined by spark potential analyzer 5, whose output signal c indicates the short-circuit part. The output signal c is compared in a comparator 7 with a reference signal of a reference value circuit 6. If the short-circuit part is too high, then comparator 7 supplies an output signal T to a first correcting input 17 of control circuit 1. Output signal T bring about a long-stroke timer movement I (cf. FIG. 2) for clearing the eroding zone.

The part of the circuit described up to now is known per se. This also supplies with regards to the possibility of supplying from comparator 7 further signals to the control circuit 1, so that in turn this controls the advance of tool electrode 3 into workpiece 3' in such a way that the aforementioned constant spacing between tool electrode 3 and workpiece 3' is substantially maintained.

It is also known according to FIG. 1, independently of the occurrence of a short-circuit signal T to perform first timer movements I, i.e. first raising/lowering movements of tool electrode 3 at constant time intervals, an additional raising/lowering movement being brought about by a possibly occurring short-circuit signal T.

For setting an optimum time interval between such timer movements the circuit according to FIG. 3 has a counter 8, a clock generator 9 connected upstream thereof, a further counter 10, a summing/dividing circuit 11 connected downstream of counters 8, 10, a subtracting circuit 12 connected downstream of circuit 11 and a register 13 and a memory and correcting circuit 14 connected downstream of subtracting circuit 12.

During the setting phase, i.e. at the start of the eroding process, the following switches are in the conductive position. A switch S1 arranged between comparator 7 and counter 8, a switch S2 arranged between comparator 7 and counter 10 and a switch S5 arranged between subtracting circuit 12 and the memory and correcting circuit 14. Further switches S3 and S4 are located in the open, i.e. non-conducting position. The open position of switch S3 prevents a correction of the value stored in memory and correcting circuit 14. In the open position of switch S3, the memory and correcting circuit merely serves as a memory circuit. The open position of switch S4 prevents the transmission of the control signals of a comparator 15 connected upstream thereof as reset signals to counter 8 or as control signals to control circuit 1.

For initiating a timer movement, in the setting phase control circuit 1 is solely controlled by the short-circuit signal T. In this phase, the clock generator 9 continuously supplies timing signals to the counting input of counter 8. Short-circuit signal T controls one of the reset inputs of counter 8 and also releases the counter content. The output signal ET of counter 8 consequently indicates the time between two short-circuits, or more precisely between two developing short-circuit situations. The counting input of counter 10 is also controlled by short-circuit signal T and its output signal N represents the number of short-circuits occurring during the setting phase.

The calculating inputs of the summing/dividing circuit 11 are supplied with the output signals ET and N of counters 8 and 10. The summing/dividing circuit 11 summates the signals ET of counter 8 and divides the thus obtained sum through the output signal N of counter 10. Output signal ETA of the summing/dividing circuit 11 represents the arithmetic mean of the output signal of counter 8, i.e. the average time between two timer movements caused by the output signal T of comparator 7.

The mean value signal ETA and an output signal $\Delta E$ of a register 13 are supplied to the calculating inputs of subtracting circuit 12. Output signal $\Delta E$ of register 13 is a positive quantity subtracted in subtracting circuit 12 from the mean value signal ETA. Thus, subtracting circuit 12 reduces the mean value signal ETA by the quantity $\Delta E$. The output signal ES of subtracting circuit 12 consequently has a safety distance from the mean value ETA of the time between two short-circuit signals T. During the setting phase, output signal ES is stored in the memory/correcting circuit 14 and after the setting phase serves as a reference value for comparator 15.

At the end of the setting phase switches S1, S2 and S5 are opened, i.e. brought into the non-conductive state, whereas switches S3 and S4 are closed, i.e. brought into the conductive state. In the now following working phase, clock generator 9 supplies its timing signals to counter 8, whereof the output signals Z at its second counting input are now supplied to one input of comparator 15. The other comparator input receives the output signal ES1 from the memory/correcting circuit 14, which is equal to ES, if its correction has taken place in circuit 14. As soon as the output signal Z of counter 8 has reached the value of the output signal ES1 of the memory/correcting circuit 14, comparator 15 also supplies a control signal T1, which is supplied to a reset input of counter 8 and resets the latter. Following onto this, counter 8 starts to count again. Output signal T1 of comparator 15 is supplied to a control input 18 of control circuit 1.

Thus, control circuit 1 supplies at its signal output 18' a signal to drive 2. The latter is constructed in two-stage form, in such a way that on triggering by the signal output 18' of control circuit 1 it performs a short-stroke timer movement II, but on triggering by a further control output 17' of control circuit 1 it performs a long-stroke timer movement I. Control circuit 1 is also constructed in such a way that it always only supplies a signal to one of the two control outputs 17' and 18'. Control output 17' has priority to the extent that it is always supplied if there is a signal at control input 17, no matter whether there is simultaneously a signal at control input 18. Thus, if a short-stroke signal T occurs, a long-stroke timer movement I is always performed, as well as when an output signal is supplied by the frequency divider circuit 16 bridging control inputs 17, 18.

The frequency driver circuit 16 is designed in such a way that it transmits every (n+1)th control pulse T1 of comparator 15 to the control input 17 of control circuit 1. Thus, after n short-stroke timer movements II there is a long-stroke timer movements II there is long-stroke timer movement I, followed by n short-stroke timer movements. Moreover, the time interval between said timer movements is the same as the time quantity represented by the output signal ES1 of the memory/correcting circuit 14. Thus, the frequency of the timer movements corresponds to the reciprocal of ES1.

For correcting the reference value ES1 supplied by the memory/correcting circuit 14, two counters, namely counters 10' and 10" are provided, downstream of which is connected in each case a threshold stage 20', 20". The outputs of threshold stages 20' and 20" are connected to the inputs of the memory/correcting circuit 14 and supply correction signals $-\Delta ES$ and $+\Delta ES$. The counting inputs of the two counters 10' and 10" are connected to the short-circuit output of comparator 7 and consequently counts the number of short-circuits. The reset inputs of counters 10', 10" are connected to the clock output of clock generator 9 across two divider stages $D_1$ and $D_2$. Thus, dividers $D_1$ and $D_2$ determine the count time of counters 10' and 10". The clock pulses of clock generator 9 are divided by a larger number in divider $D_2$ then in divider $D_1$. Thus, counter 10" counts for a longer time than counter 10'.

If the short-circuit number counter by counter 10' within the given counting time is smaller than the threshold value of the threshold circuit 20', the latter supplies no output signal. If the short-circuit number counted by counter 10' is equal to or greater than the threshold value of threshold circuit 20', the latter supplies an output signal, namely signal $-\Delta ES$ to the memory/correcting circuit 14. An appearance of the output signal $-\Delta ES$ means that despite the regular timer movements too many short-circuits have occurred and consequently the reference value ES1 for comparator 15 must be reduced, i.e. the frequency of the timer movements must be increased.

However, if the short-circuit number counted by counter 10" reaches or exceeds the threshold value of the threshold circuit 20' connected downstream thereof, then the threshold circuit 20" supplies no output signal. However, if the short-circuit number counted by counter 10" remains below the threshold value of threshold circuit 20", the latter supplies a correction signal $+\Delta ES$ to the memory/correcting circuit 14. The appearance of the output signal $+\Delta ES$ of threshold circuit 20" means that too few short-circuits and in particular no short-circuits have occurred and consequently the reference time ES1 for comparator 15 is increased, i.e. the frequency of the timer movements can be reduced. Thus, it is ensured that the minimum number of regular timer movements is performed.

A dynamic smoothing of the correcting circuit is obtained in that a dividing circuit $D_3$ or $D_4$ is in each case connected downstream of the two threshold circuits 20' and 20" and whereby both e.g only supply every third output signal of the threshold circuits 20', 20" to the memory/correcting circuit 14.

For modifying the stroke height H of timer movements I and II, there is also a measuring circuit 23 for determining the penetration depth of the tool electrode 3 into the workpiece 3'. The output signal d of measuring circuit 43 is supplied to a correcting number 22, which in turn supplies an output signal to drive 2 and consequently with increasing penetration depth of tool electrode 3 into workpiece 3' modifies, preferably stepwise and not continuously, the stroke height H of the timer movements I, II.

What is claimed is:

1. A method for purging the eroding zone in electroerosion countersinking wherein a tool electrode engages a workpiece in a dielectric, comprising the steps of:
   (a) raising the electrode away from the workpiece to a relatively high stroke height and then lowering the electrode to the workpiece;
   (b) thereafter raising the electrode away from the workpiece to a relatively low stroke height and then lowering the electrode to the workpiece; and
   (c) thereafter repeating step (a); wherein step (b) is performed at least twice at different times between the performance of step (a) and step (c) and steps, (a), (b) and (c) are repeated as successive cycles.

2. The method of claim 1 wherein the given time interval (ES1) between successive raising/lowering movements is reduced, if within the given first time intervals or within a predetermined number of directly succeeding first time intervals more than one short-circuit-caused, additional raising/lowering movement is performed.

3. The method of claim 2 wherein the given interval (ES1) between the successive raising/lowering movements is increased if, within the given second time intervals or within several directly succeeding given second time intervals, no short-circuit caused additional raising/lowering movements are performed.

4. The method of claim 1 wherein the steps (b) are spaced in time at constant time intervals.

5. The method of claim 4 wherein the time interval in which steps (a) and (c) are carried out are identical and are equal to the time intervals between performance of each of the steps (b).

6. The method of claim 5 wherein the number n and/or the stroke heights of steps (b) performed between steps (a) and (c) is always the same.

7. The method of claim 6 wherein the stroke height in each step (b) falls between 1/20 to ¾ of the stroke height in each step (a).

8. The method of claim 6 wherein the stroke height in each step (b) falls between 1/10 to ½ of the stroke height in each step (a).

9. The method of claim 6 wherein the stroke height in each step (b) falls between 1/6 to ⅓ of the stroke height in each step (a).

10. The method of claim 6 wherein the time interval (T; $ta_n - ta_{n-1}$) and/or the stroke height (h) of the various raising/lowering movements is controlled as a function of the process conditions in the eroding zone.

11. The method of claim 10 wherein in setting the time interval of the various raising/lowering movements
    (1) the eroding process is allowed to take place freely during a setting phase of predetermined duration during which the eroding zone is monitored for a developing short-circuit situation and when a short-circuit situation develops a first raising/lowering movement step or step is performed, (2) the number (N) of short-circuit situations developing during the setting phase, as well as their reciprocal time intervals (ET) is measured and from this is determined the average time interval (ETA), hereinafter called average short-circuit time interval, and (3) the average short-circuit time interval (ETA) is given as the time interval between any two directly succeeding steps.

12. The method of claim 11 wherein the given time interval between any two immediately succeeding raising/lowering movements a time is chosen which is smaller by a safety value ($\Delta E$) than at the average short-circuit time interval (ETA).

13. The method of claim 1 wherein for modifying the given time interval between directly succeeding steps:

(a) the eroding zone is monitored for a developing short-circuit situation and if a short-circuit situation develops, an additional raising/lowering movement is performed independently of the given time interval (ES1) of the raising/lowering movements, (b) the frequency of the additionally performed raising/lowering movements is determined, and (c) as a function of this frequency the length of the given time interval (ES1) is modified and the thus modified time interval (ES1) is given as the new time interval.

14. Apparatus for purging the erosion zone used in an electroerosion countersinking process wherein a tool electrode engages a workpiece in a dielectric, said apparatus comprising:

first means for carrying out a first operation wherein the electrode is raised away from the workpiece to a relatively high stroke height and then the electrode is lowered to the workpiece; and second means for carrying out a second operation wherein the electrode is raised away from the workpiece to a relatively low stroke height and then the electrode is lowered to the workpiece, wherein the first and second means are incorporated into a two stage raising and lowering device which performs at least one second operation between the performances of two successive first operations which are spaced in time.

15. Apparatus as set forth in claim 14 further including:

a short-circuit monitoring device, which gives a short-circuit signal (T) in the case of a short-circuit situation developing in the eroding zone and which is connected to the raising/lowering device in such manner that if a short-circuit signal (T) appears, the latter performs an additional raising/lowering movement; and an additional device for determining the frequency of the additionally initiated raising/lowering movements and having a signal output connected to the correcting input of a correcting member provided on the raising/lowering device for modifying the given time interval (ES1) between the raising/lowering movements (I, II).

16. Apparatus as set forth in claim 15 wherein the additional device has a counting stage for counting the additional raising/lowering movements which have taken place within first predetermined counting intervals ($D_1$) and a threshold circuit connected thereto and whose output is connected to a first correcting input of the correcting member of the raising/lowering device in such manner that the threshold circuit supplies the first correcting input of the correcting member with a correcting signal ($-\Delta ES$) for reducing the predetermined first time interval (ES) if the counting stage content exceeds a predetermined first threshold value.

17. Apparatus as set forth in claim 16, wherein the additional device has a second counting stage for counting additional raising/lowering movements which have taken place within second predetermined counting intervals ($D_2$), as well as a second threshold circuit connected thereto and whose output is connected to a second correcting input of correcting member of the raising/lowering device in such a way that the second threshold circuit supplies a correcting signal ($+\Delta ES$) to the second correcting input of correcting member if the counting stage content does not reach a predetermined second threshold value.

18. Apparatus as set forth in claim 17, wherein the raising and lowering device has a correcting member for setting the stroke height (H) of the first raising/lowering movements (I) and a device for determining the penetration depth (d) of the tool electrode into the workpiece, the signal output of the penetration depth determining device being connected to the correcting input of the correcting member for setting the stroke height.

* * * * *